United States Patent [19]

Buckley

[11] Patent Number: 4,918,750

[45] Date of Patent: Apr. 17, 1990

[54] MOTOR VEHICLE RADIO-CASSETTE UNIT CAMOUFLAGE SYSTEM

[76] Inventor: Alan Buckley, 162 W. 21 St., New York, N.Y. 10128

[21] Appl. No.: 182,732

[22] Filed: Apr. 18, 1988

[51] Int. Cl.$^4$ .............................................. H04B 1/08
[52] U.S. Cl. .................................... 455/345; 455/347
[58] Field of Search ............... 455/345, 347, 348, 344, 455/351; 360/137; 369/11; 248/313, 223.4, 224.4, 225.1, 225.2; 220/62, 352, 356; 206/387; 307/10 AT; 361/396, 391, 422, 424

[56] References Cited

U.S. PATENT DOCUMENTS

| | | | |
|---|---|---|---|
| 4,248,069 | 2/1981 | Burbank | 453/345 |
| 4,365,280 | 12/1982 | Crosetti | 455/347 |
| 4,532,162 | 7/1985 | Neece | 455/345 |
| 4,584,717 | 5/1986 | Struckland | 455/345 |

Primary Examiner—Robert L. Griffin
Assistant Examiner—Curtis Kuntz
Attorney, Agent, or Firm—Edward Callahan

[57] ABSTRACT

A theft prevention camouflage system for a radio-cassette unit including control means removably mounted in the dashboard of a motor vehicle. A cover is removably positioned at the dashboard for concealing the radio-cassette unit from view. A tongue member connected to the cover is adapted to be removably positioned in the cassette recess of the radio-cassette or cassette so as to act as a grip holding the cover in place over the radio-cassette unit around the frame. A protruding lip extending transversely from the inner surface of the edge of the cover and the inner surface of the cover define a hollow; the auditory control means are positioned in the hollow when the cover is mounted over the radio-cassette unit. The outer surface of the cover is generally of the same decorative scheme as the dashboard. The tongue member is capable of being removably positioned in the cassette recess by way of hook-and-loop connecting elements mounted to a base at the inner end of the tongue member and covering the inner surface of the cover so that the tongue member can be positioned at any position on the cover in accordance with the various cassette recess locations of the various radio-cassette models and manufacturers.

2 Claims, 2 Drawing Sheets

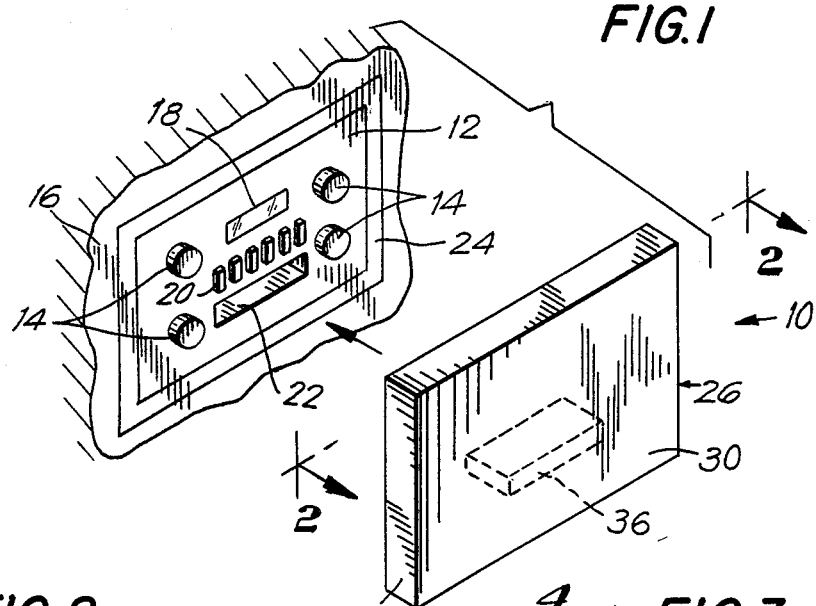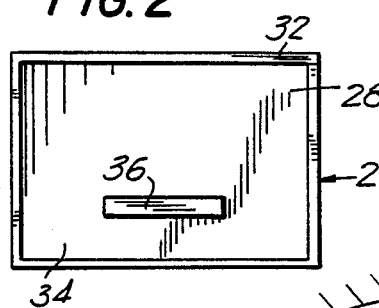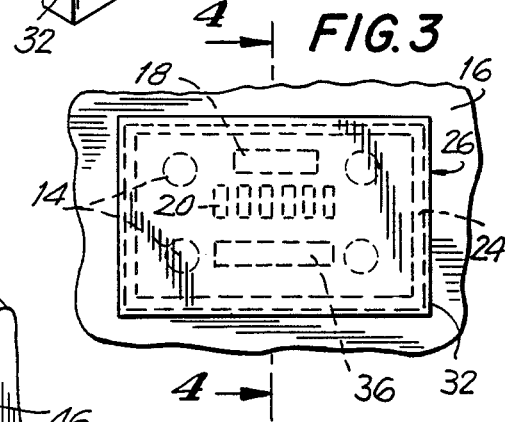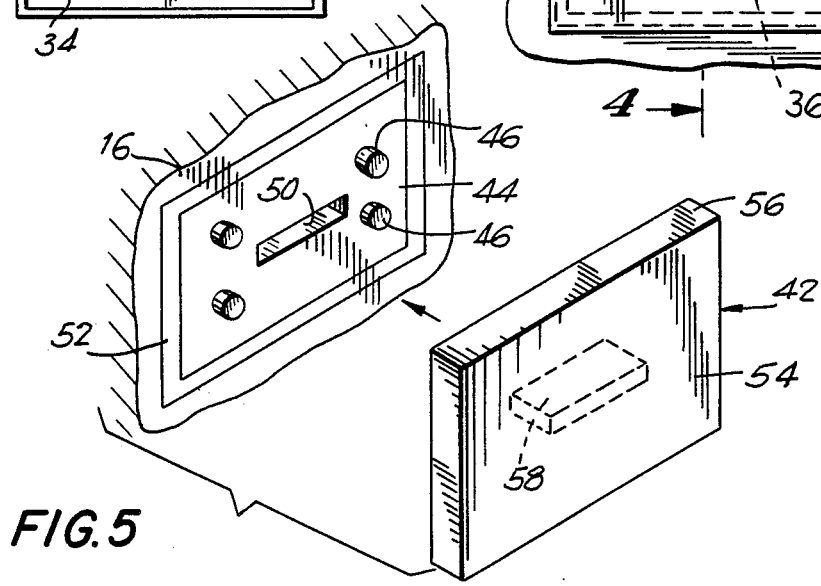

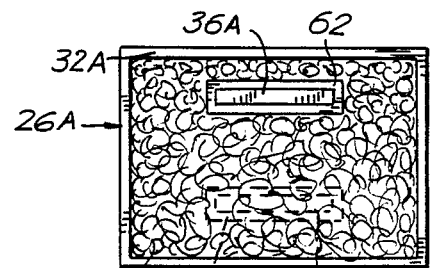
FIG. 7
FIG. 4
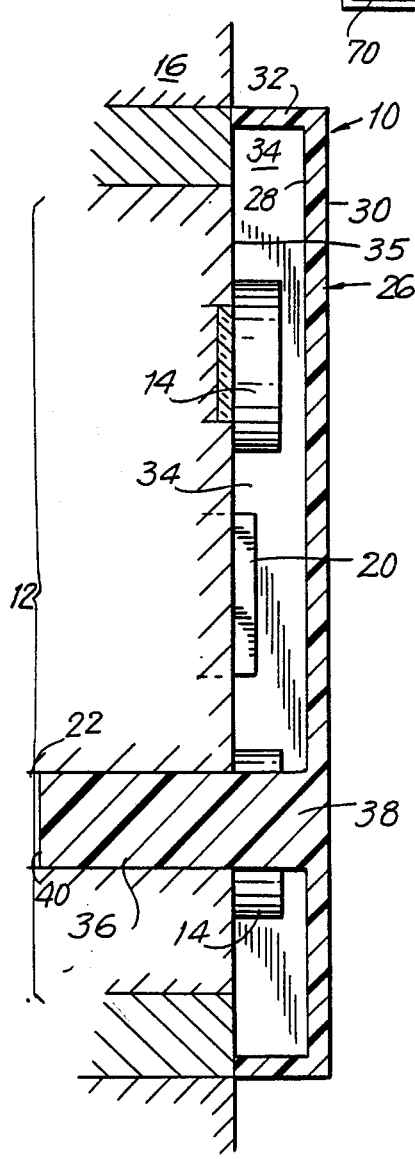
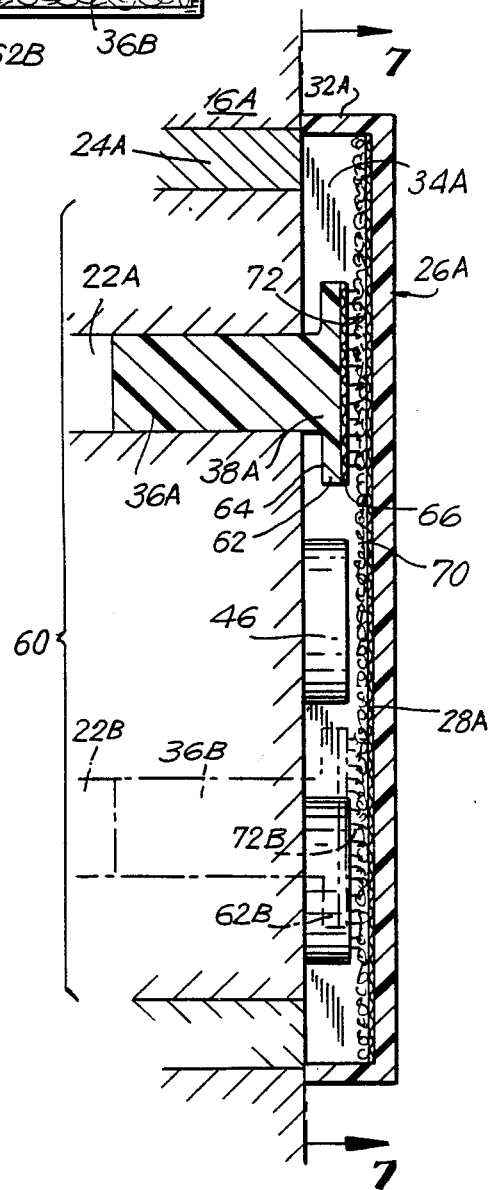
FIG. 6

MOTOR VEHICLE RADIO-CASSETTE UNIT CAMOUFLAGE SYSTEM

FIELD OF THE INVENTION

This invention relates generally to motor vehicle break-in theft prevention systems and more particularly to a camouflage cover for a motor vehicle radio-cassette unit.

BACKGROUND OF THE INVENTION

Anyone who has been through the unfortunate experience of a break-in theft of a motor vehicle radio-cassette unit knows that the total cost of the break-in amounts to far more than the price of replacing the stolen unit alone. Other expenses include the cost of general damage repair including window, door, and dashboard damage, lost time at the repair shop, increased insurance premiums, and possible reduced vehicle resale value. Added to all this is the emotional toll of having one's valued personal property violated.

While theft prevention systems for vehicles are known, they tend to be expensive and ineffective. The removal of temptation for a thief can accomplish the purpose of theft prevention at a lower cost than an elaborate prevention system.

It is known that motor vehicle break-in thieves are drawn by visual observation of radio-cassette units. The thief selects his target after ascertaining that a desirable radio-cassette unit is in place. The more expensive the model of vehicle, the better the quality of a radio-cassette stereo system and therefore the greater the temptation is to break in. A thief will visually verify the presence of a radio-cassette unit by noting the front unit, which includes control knobs or buttons, a cassette recess, a dial, and dial control knobs or buttons at the dash unit. If there is a question whether or not a radio-cassette unit is mounted in the dashboard, the odds are that the thief will pass up that particular vehicle.

In accordance with the above objects and others which will become apparent hereinafter, there is provided a theft prevention camouflage system for a radio-cassette unit unit including control means removably mounted in the dashboard of a motor vehicle. A cover is removably positioned at the dashboard for concealing the radio-cassette unit from view. A tongue member connected to the cover is adapted to be removably positioned in the cassette recess of the radio-cassette unit so as to act as a grip holding the cover in place over the radio-cassette unit around the frame. A protruding lip extending transversely from the inner surface of the edge of the cover and the inner surface of the cover define a hollow; the auditory control means are positioned in the hollow when the cover is mounted over the radio-cassette unit unit. The outer surface of the cover is generally of the same decorative scheme as the dashboard. The tongue member is capable of being removably positioned in the cassette recess by way of hook-and-loop connecting elements mounted to a base at the inner end of the tongue member and covering the inner surface of the cover so that the tongue member can be positioned at any position on the cover in accordance with the various cassette recess locations of the various radio-cassette and cassette models and manufacturers.

The present invention will be better understood and the objects and important features, other than those specifically set forth above, will become apparent when consideration is given to the following details and description, which when taken in conjunction with the annexed drawings, describes, discloses, illustrates, and shows preferred embodiments or modifications of the present invention and what is presently considered and believed to be the best mode of practice in the principles thereof. Other embodiments or modifications ma be suggested to those having the benefit of the teachings herein, and such other embodiments or modifications are intended to be reserved especially as they fall within the scope and spirit of the subjoined claims.

SUMMARY OF THE INVENTION

Accordingly, it is a principle object of this invention to provide a camouflage system for a radio-cassette unit unit mounted in the dashboard of a motor vehicle.

It is another object of this invention to provide a camouflage system for a radio-cassette unit of a motor vehicle which can be easily mounted over or removed from the unit.

It is another object of this invention to provide a camouflage system for a radio-cassette unit of a motor vehicle which can be easily adapted to fit over and be removably secured to the unit.

It is another object of this invention to provide a camouflage system for a radio-cassette unit which is adjustable by the user to his make and model of motor vehicle radio-cassette or cassette unit.

BRIEF DESCRIPTION OF THE DRAWINGS

FIG. 1 is a perspective view of a radio-cassette unit camouflage cover in the process of being mounted over a radio-cassette unit at the dashboard of a motor vehicle;

FIG. 2 is an inner view of the camouflage cover taken through plane 2—2 of FIG. 1;

FIG. 3 is an outside view of the camouflage cover when mounted in the camouflage mode over the radio-cassette unit in the dashboard;

FIG. 4 is a sectional side view of the camouflage cover taken through line 4—4 of FIG. 3;

FIG. 5 is a perspective view of a radio-cassette unit camouflage cover in the process of being mounted over a dashboard radio-cassette unit;

FIG. 6 is a sectional side view of an alternate embodiment of the camouflage cover having an adjustable mounting tongue; and FIG. 7 is a view taken through line 7—7 of FIG. 6.

DETAILED DESCRIPTION OF THE PREFERRED EMBODIMENT

Reference is now made specifically to the drawings in which identical or similar parts are designated by the same reference numerals throughout.

FIG. 1 illustrates a theft prevention camouflage system 10 for a radio-cassette unit 12 including auditory control dials 14 is removably mounted in the dashboard 16 of a motor vehicle. Auditory control dials 14 are illustrated for purposes of exposition only and it is to be understood that dials 14 represent any type of controls, such as buttons, which may be present on any of the various models of radio-cassette units. A radio dial 18 is shown at the top of radio-cassette unit 12 with radio dial control buttons 20 shown just below dial 18. A rectangular cassette recess 22 is located at the bottom of radio-cassette unit 12 below dial buttons 20. Radio-cassette unit 12 is removably positioned in a frame 24, which in turn is mounted in dashboard 16. Camouflage system 10 is capable of being placed in a camouflage position over frame 24 and radio-cassette unit 12 at dashboard 16.

FIGS. 1 and 2 illustrate a rectangular cover 26 in the process of being removably positioned at dashboard 16 so as to conceal radio-cassette unit 12 from view; and FIGS. 3–4 illustrate cover 26 positioned in its covering camouflage mode over radio-cassette unit 12 and frame 24. Cover 26 has opposed rectangular inner and outer flat surfaces 28 and 30, respectively, relative to dashboard 16 and includes a protruding lip 32 extending transversely from the rectangular edge of inner surface 28 towards dashboard 16. Inner surface 28 and lip 32 define a rectangular hollow space 34. Cover 26 overlies both radio-cassette unit 12 and frame 24 with lip 32 in contact with dashboard front surface 35. Dial buttons 20 and auditory control dials 14 are positioned in hollow space 34 when cover 26 is mounted over radio-cassette unit 12.

Cover 26 includes a tongue member 36 rectangular in cross-section having opposed inner and outer ends 38 and 40, respectively. Inner end 38 is connected to inner surface 28 of cover 26. Tongue member 36 with outer end 40 is capable of being removably positioned in cassette recess 22 when cover 26 is mounted over radio-cassette unit 12 so that tongue member 36 acts as a grip holding cover 26 in place around frame 24.

Front surface 35 of dashboard 16 has a decorative scheme which outer surface 30 generally matches so that an observer from outside the vehicle would see only a generally uniform front surface of dashboard 16 without seeing radio-cassette unit 12.

FIG. 5 illustrates a theft prevention camouflage system 42 for a radio-cassette unit 44 including auditory controls, shown as dials 46 (although control buttons are also used in the art) removably mounted in a dashboard 16 of a motor vehicle. A cassette recess 50 rectangular in cross-section is located in the middle area of radio-cassette unit 44. Radio-cassette unit 44 is removably positioned in a frame 52, which in turn is mounted dashboard 16. Camouflage system 42 is capable of being placed in a camouflage position over frame 52 and radio-cassette unit 44 at dashboard 16. A rectangular cover 54 analogous to cover 26 described above is shown in the process of being removably positioned at dashboard 16 so as to conceal radio-cassette unit 44 from view. Cover 54 has opposed rectangular inner and outer flat surfaces relative to dashboard 16 and includes a protruding lip 56 extending transversely from the rectangular edge of the inner surface towards dashboard 16. The inner surface of cover 54 and lip 56 define a rectangular hollow space analogous to hollow space 34 of cover 26 described earlier. Cover 54 overlies both radio-cassette unit 44 and frame 52 with lip 56 in contact with the front surface of dashboard 16. Auditory control dials 46 are positioned in the hollow space when cover 54 is mounted over radio-cassette unit 44. Cover 54 includes a tongue member 58 rectangular in cross-section having opposed inner and outer ends relative to the inner surface of cover 54 with the inner end connected to the inner surface of cover 54. Tongue member 58 is removably positioned in cassette recess 50 when cover 54 is mounted over radio-cassette unit 44 so that tongue member 58 acts as a grip holding cover 54 in place around frame 52. The front surface of cover 54 has a decorative scheme which generally matches the dashboard outer surface so that an observer from outside the vehicle would see only a generally uniform front surface of dashboard 16 without seeing radio-cassette unit 44.

An alternate embodiment of the invention is illustrated in FIGS. 6 and 7 where a cover 26A has been placed in its camouflage position over a radio-cassette unit 60 and its frame 24A with its lip 32A in contact with a dashboard 16. A tongue member 36A rectangular in cross-section has its outer end 40A mounted in a radio-cassette recess 22A in cassette unit 60. A rectangular base portion 62 having opposed inner and outer sides 64 and 66, respectively, is connected to inner end 38A of tongue member 36A at outer side 66. Tongue member 36A is removably secured to inner flat surface 28A of cover 26A by a hook-and-loop connector, the loop element 70 of which is attached to the entire inner flat surface 28A and the hook element 72 of which is attached to outer side 66 of base portion 62. Tongue member 36A can be positioned at any location on inner flat surface 28A so that tongue member 36A is adapted to be connected to a selected location on inner surface 28A so as to be aligned with any location of the cassette recess of the various types of radio-cassette units. For example, as illustrated in phantom line in FIGS. 6 and 7, tongue member 36A can be moved to location 36B and there attached by the hook-and-loop connector to inner surface 28A at a new position aligned with a cassette recess 22B of another model of radio-cassette. By this embodiment, the manufacturer of the cassette camouflage system can manufacture a mimimum number of sizes of camouflage covers which can be adapted to be mounted to a wide range of various cassette brands and models.

The embodiment of the invention particularly described and disclosed herein is presented merely as an example of the invention. Other embodiments, forms, and modifications of the inventions coming within the proper scope and spirit of the appended claims will, of course, readily suggest themselves to those skilled in the art. In particular, the sizes and shapes of the covers 26, 26A, and 54 and tongue members 36, 36A, and 58 described above can be varied to accommodate any model or manufacture of a radio-cassette or cassette.

What is claimed is:

1. A theft prevention camouflage system for a radio-cassette unit including control means, said radio-cassette unit being mounted in the dashboard of a motor vehicle, the radio-cassette having a cassette recess, including, in combination,
    cover means capable of being removably positioned at the dashboard by a user for concealing the radio-cassette unit from view,
    said cover means including a rectangular cover having opposed inner and outer rectangular surfaces relative to the dashboard, said inner and outer surfaces having a rectangular edge and a protruding lip extending transversely from said inner surface around said edge, said inner surface and said lip defining a hollow, said control means being positioned in said hollow when said cover is mounted over the radio-cassette unit,
    mounting means connected to said cover means, said mounting means being for being removably positioned in the cassette recess so as to hold said cover means in place around the radio-cassette unit, the cassette recess being generally rectangular in cross-section and said mounting means being a tongue member generally rectangular in cross-section and having opposed inner and outer ends, said inner end being removably connected to said inner surface of said cover, said tongue member along with said outer end of said tongue member being capable of being removably positioned in the recess, and a hook-and-loop connector mounted to said cover and to said tongue member, one element of said hook-and-loop connector being connected to the entire inner surface of said cover and the other element of said hook-and-loop connector being connected to said inner end of said tongue member, wherein said tongue member is removably connected to said inner surface of said cover and is capable of being removably connected to said inner surface at a selected position by the user in accordance with the location of the cassette recess.

2. The theft prevention camouflage system according to claim 1, wherein the dashboard has a decorative scheme, said outer surface of said cover being generally of said decorative scheme.

* * * * *